United States Patent
Peterson, II

[11] 3,910,428
[45] Oct. 7, 1975

[54] COAL TO REACTOR FEEDER FOR COAL LIQUIDIFICATION

[76] Inventor: William Donald Peterson, II, 1996 E. 4675 South, Salt Lake City, Utah 84117

[22] Filed: Nov. 15, 1973

[21] Appl. No.: 416,210

[52] U.S. Cl............ 214/17 CC; 222/148; 222/368; 277/22; 277/135
[51] Int. Cl.².......................................... B65G 65/32
[58] Field of Search........ 214/17 CC; 222/148, 368; 302/49

[56] References Cited
UNITED STATES PATENTS
| | | | |
|---|---|---|---|
| 2,644,724 | 7/1953 | Kronstad | 222/194 X |
| 2,652,935 | 9/1953 | Messing | 214/17 CC |
| 2,921,721 | 1/1960 | Brooks | 222/194 X |
| 3,151,784 | 10/1964 | Tailor | 214/17 CC X |
| 3,612,307 | 10/1971 | Vogt | 222/368 X |

Primary Examiner—Robert G. Sheridan

[57] ABSTRACT

A solid material feeding system for having controlled feeding of a granulated solid material from a hopper to a reactor and mixing with the solid material a gas which reacts with the solid in the reactor, the gas also cleaning the feeder, promoting a continuous flow without material plugging and hangup; the feeder atmosphere being high pressure hydrogen, the feeder drive shaft being sealed from the atmosphere by a sealing system of high pressure hydrogen over liquid via a low pressure seal, the high pressure liquid over atmosphere via a high pressure seal, the liquid being cooled as required.

4 Claims, 4 Drawing Figures

U.S. Patent   Oct. 7,1975   3,910,428
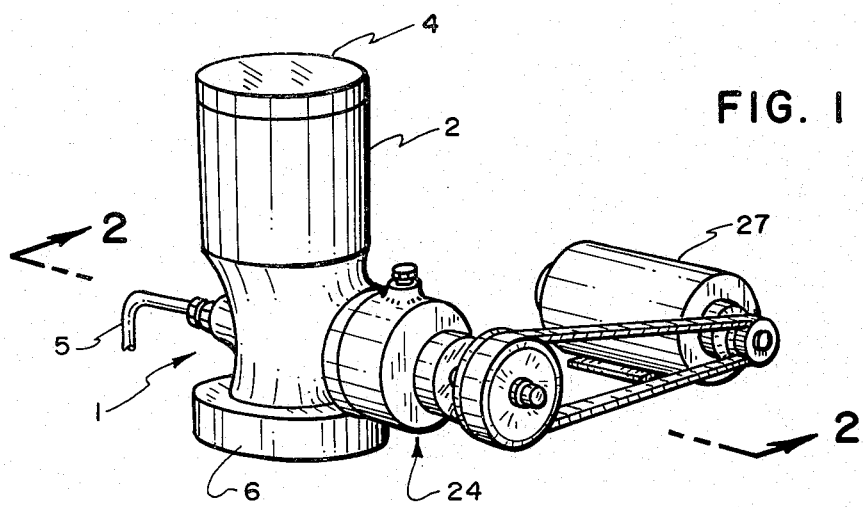
FIG. 1
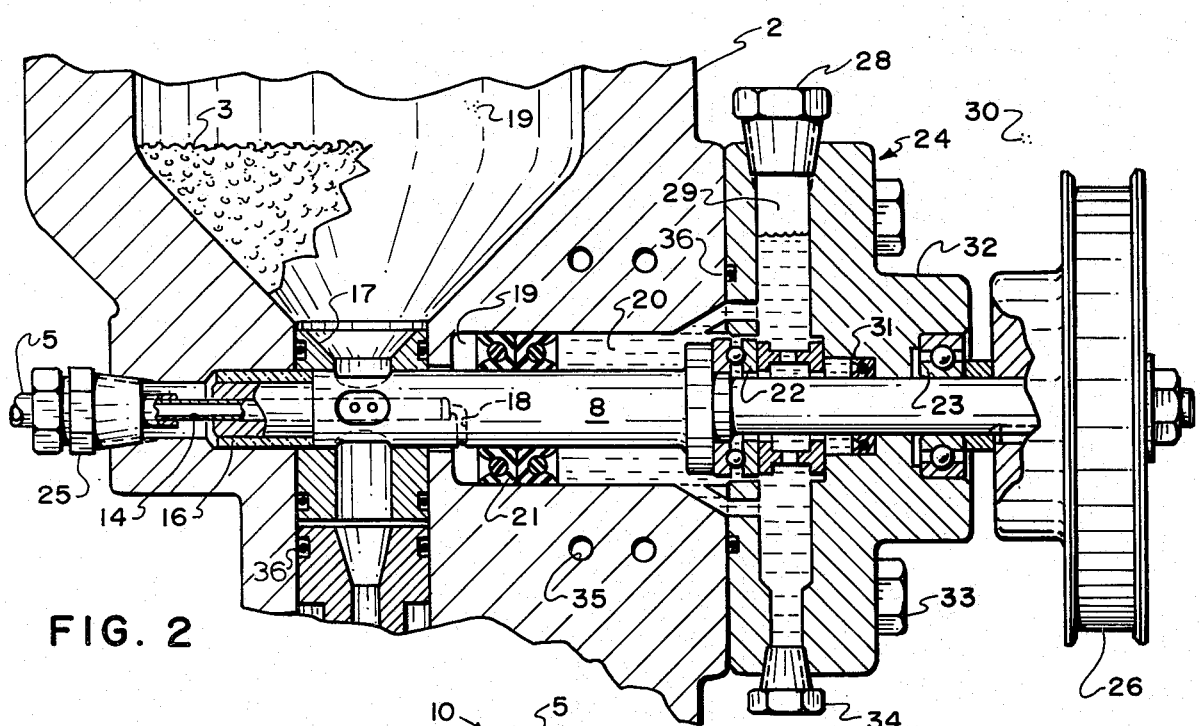
FIG. 2
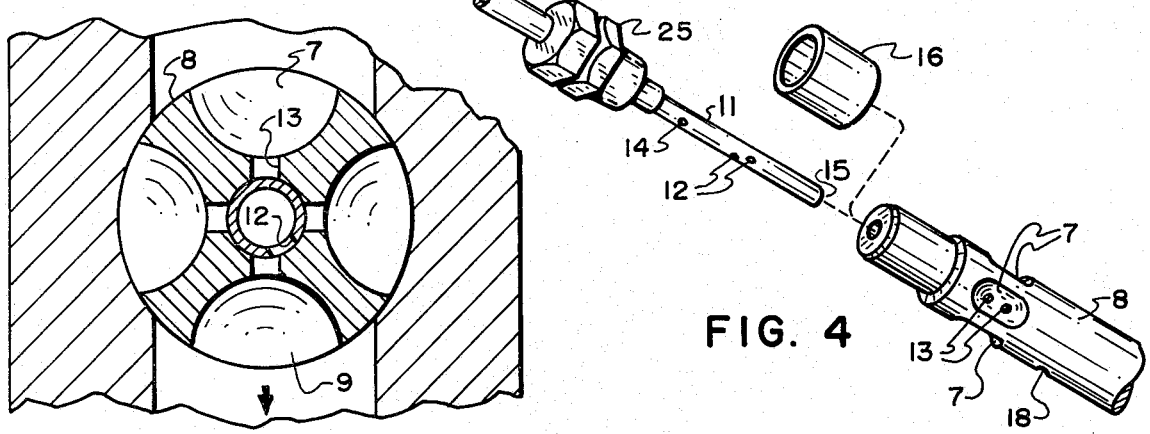
FIG. 3
FIG. 4

COAL TO REACTOR FEEDER FOR COAL LIQUIDIFICATION

BRIEF SUMMARY OF THE INVENTION

A method of converting coal to petroleum oil consists of feeding the granulated coal mixed with hydrogen through a tubular reactor in the presence of a catalyst, the pressure of the reactor being approximately 3,000 psi and the temperature being approximately 1200° F, the hydrogen molecules combining with the coal molecules to form a petroleum type molecule.

To have optimum reaction results, the granulated coal must have regulated feeding and optimum mixing with the hydrogen; also, an even feeding rate is required to avoid plugging the tubular reactor. The invention is a rotating star type feeder which receives small bucket loads of granulated coal from a hopper and transmitts this material to a reactor via a tube type channel. The star buckets are purged and kept clean by hydrogen which flows from the bottom of a bucket when the bucket is in a dump position. The hydrogen thus also mixes with the granulated coal assisting the granules to separate into a homogeneous free falling granulated coal and hydrogen mixture. The coal feed rate is determined by the size and number of star buckets and the rate of the star rotation. To rotate the star requires a unique seal for the drive shaft since the atmosphere is high pressure hydrogen which may be hot. Since high pressure hydrogen is difficult to seal and hydraulic fluid is most easily sealable, the feeder drive shaft is sealed from the ambient atmosphere by a sealing system of the high pressure hydrogen being sealed over the same high pressure hydraulic fluid via a low pressure seal, the high pressure hydraulic fluid being sealed over the ambient atmosphere via a high pressure seal, the hydraulic fluid being cooled as required by a thermal heat exchange through a cooling jacket to protect the high pressure seal from over heating and to prevent the liquid from vaporizing.

The invented feeder can very possibly be used to replace the intake manifold system of a conventional internal combustion engine thus converting the fuel used from gasoline or petroleum to granulated coal. In this application the gas or fluid used to purge the star feeder buckets would be an oxidizer such as air.

BRIEF DESCRIPTION OF THE SEVERAL VIEWS OF THE DRAWING

FIG. 1 is a pictorial view of the coal hopper and feeder system showing the rotating star feeder being driven by a motor.

FIG. 2 is a cross section view through the system showing the rotating star feeder below the hopper with the purge tube entering from the left and the drive shaft on the right with its sealing system.

FIG. 3 is a cross sectional view of the star feeder showing the buckets as they surround the purge tube. Bucket purge holes are shown in the bottom of each bucket purging out the coal as alignment with the hole in the purge tube occurs.

FIG. 4 is a view of the purge tube and the rotating feeder, the purge tube being pulled out of its operating position within the feeder.

DETAILED DESCRIPTION

The coal hopper feeder assembly 1 has a hopper 2 to contain granulated coal 3 which is put into the hopper 2 through the lid 4. Purge gas enters the feeder 1 through a gas inlet tube 5. A reactor being fed by the feeder 1 will attach to the feeder 1 at the flange 6. Coal 3 is collected in buckets 7. The buckets 7 are an integral part of a rotating drive shaft 8. As this cylindrical rotating shaft 8 rotates the integral buckets 7 revolve from the coal 3 hopper side to the dump or discharge position 9. Fluid 10 such as hydrogen entering the gas inlet tube 5 proceeds into a purge tube 11 which is in a fixed position. The purge tube 11 has one or more fluid purge or discharge holes 12 which align in the direction of flow of the coal through the feeder 1 with the buckets 7 as they come into the dump or discharge position 9. To prevent fluid 10 leaking around the buckets 7, the purge tube 11 should be close fitting into the shaft 8 hole which it fits into. The buckets 7 have bucket purge holes 13 which align with the purge tube 11 fluid discharge holes 12 as a bucket 7 comes into the dump or discharge position 9. Thus, fluid 10 entering the gas inlet tube 5 proceeds into the purge tube 11 and then out through the discharge holes 12 through the bucket purge holes or ports 13 forcing coal 3 out of a bucket 7 when at the dump or discharge position 9. The purge tube 11 has an additional up-stream discharge port 14 and a down-stream discharge port 15 or open end. The up-stream discharge port 14 allows fluid 10 to proceed along the end bearing 16 between the rotating shaft 8 and the housing 17 the shaft rotates in, preventing coal 3 granules from working back and accumulating between the bearing surfaces. Likewise, fluid 10 from the downstream port 15 flowing through the rotating shaft 8 via a hole 18 flows between the rotating shaft 8 and the housing 17 and prevents coal 3 granules from working into and accumulating at the gas 19 liquid 20 seals 21 interface. The rotating shaft 8 is supported by an end bearing 16, a thrust bearing 22, and a drive bearing 23. 0-ring seals 36 seal the hopper 2 housing to the housing 17 and drive assembly 24. A tube fitting 25 seals the gas inlet tube 5 and the hopper 2 housing. The rotating shaft 8 has a pulley 26 on its end which is turned at various speeds by a motor 27, the motor 27 or shaft 8 rotating speed thus determining the coal 3 flow rate through the feeder 1. High pressure hydrogen 19 being small molecules is difficult to seal in. This hydrogen 19 would be especially hard to seal between the rotating shaft 8 and drive assembly 24. Thus, a liquid 20 is interposed between them. This liquid 20 is put in a hole sealed by a plug 28. When liquid 20 is put in, air voids 29 will probably be present. To maintain a low pressure differential across the gas 19 liquid 20 seals 21 the seal 21 is allowed to slide along the shaft 8 in the hopper 2 body thus compressing the air void 29. The liquid 20 is sealed from the outside atmosphere 30 by a high pressure seal 31 which is between the drive shaft 8 and the drive assembly 24 housing 32 which the shaft 8 passes through. The drive assembly 24 is attached to the hopper 2 body by bolts 33. A drain plug 34 is provided to remove the liquid 20. Note that no gas 19 liquid 20 seal 21 is required if the shaft 8 is vertical with the drive pulley 26 down. Thus the gas 19 to liquid interface being direct. In some instances the gas 19 may be hot. This heat may occur as gas is heated in the reactor below and then rises. Note also the source of the gas 19 from the inlet gas 10 which enters as previously described between the shaft 8 and the housing 17. Should the gas 19 be very hot, heating of rotating shaft seals 21 and 31 and the liquid 20 might occur causing seals 21 and 31 failure along with liquid 20 vaporizing. To prevent this from occurring, a heat sink 35 is provided in the hopper 2 body. Such a heat sink 35 might be a cooling jacket with circulating water.

I claim:

1. Apparatus for feeding granular material from a hopper to a second vessel while maintaining a seal there between, comprising an outlet opening in the hopper bottom, a hollow shaft mounted transverse of said opening closing the same and rotatable therein, a plurality of buckets formed in the surface of said shaft and arranged to register successively with the interior of said hopper upon rotation of said shaft, a tube received axially in the interior of said hollow shaft, means fixing said tube against rotation, means for rotating said shaft about said tube, a port in the bottom of each of said buckets, a first port in the side wall of said tube positioned to register with said port in the bottom of successive ones of said buckets as they rotate about said tube to a discharge position, means for supplying pressured fluid to said tube to exit from said port, at least two additional ports in said tube located one on each side of the path of travel of said buckets, and means sealing said shaft on both sides of said buckets so that pressured fluid supplied to said tube flows from said additional ports toward said outlet opening of said hopper.

2. Apparatus according to claim 1 in which one end of said shaft extends through said sealing means to the atmosphere and said sealing means comprises an outer seal element encircling said shaft, a housing about said seal element and shaft, a body of liquid in said housing inboard of said seal element and surrounding said shaft, and means confining said body of liquid to terminate outboard of said one additional port in said tube and of one side of said buckets whereby pressured fluid supplied through said tube is blocked from leakage by said liquid.

3. Apparatus according to claim 2 in which said means confining said body of liquid comprises a second seal about said shaft and axially slidable thereon inboard of said first mentioned seal element.

4. Apparatus according to claim 2 with the addition of a heat sink for cooling said body of liquid.

* * * * *